(12) United States Patent
Macnaughton et al.

(10) Patent No.: US 6,857,979 B2
(45) Date of Patent: Feb. 22, 2005

(54) COMBINATION BELT TENSIONER AND IDLER

(75) Inventors: Bruce Macnaughton, North York (CA); Robert J. Laing, Moffat (CA); Nabil Mishrigi, Markham (CA)

(73) Assignee: Litens Automotive Partnership, Woodbridge (CA)

( * ) Notice: Subject to any disclaimer, the term of this patent is extended or adjusted under 35 U.S.C. 154(b) by 98 days.

(21) Appl. No.: 10/279,952

(22) Filed: Oct. 24, 2002

(65) Prior Publication Data

US 2003/0083164 A1 May 1, 2003

Related U.S. Application Data

(60) Provisional application No. 60/330,637, filed on Oct. 26, 2001.

(51) Int. Cl.[7] .................................................. F16H 7/12
(52) U.S. Cl. ...................................... 474/135; 474/101
(58) Field of Search ................................ 474/101, 109, 474/110, 113, 117, 134, 135, 138

(56) References Cited

U.S. PATENT DOCUMENTS

| 1,675,671 | A | | 7/1928 | Stein |
| 3,895,544 | A | | 7/1975 | Suzaki |
| 4,557,709 | A | * | 12/1985 | St. John ..................... 474/117 |
| 4,758,208 | A | | 7/1988 | Bartos et al. |
| 4,981,116 | A | | 1/1991 | Trinquard |
| 5,011,460 | A | * | 4/1991 | Ouchi et al. ................ 474/133 |
| 6,167,686 | B1 | | 1/2001 | Becker et al. |

* cited by examiner

Primary Examiner—David A. Bucci
Assistant Examiner—Vicky A. Johnson
(74) Attorney, Agent, or Firm—Clark Hill PLC

(57) ABSTRACT

A combination belt tensioner and idler has a fixed pivot structure. A moveable arm is mounted for pivotable movement about the pivot structure. A belt tensioning pulley is mounted on the moveable arm. A helical coil spring biases the moveable arm in a direction so as to force the pulley into tensioning engagement with a belt. A mounting bolt mounts the fixed pivot structure on a motor vehicle engine. An idler pulley is mounted for rotational movement about an axis defined by the mounting bolt.

12 Claims, 1 Drawing Sheet

COMBINATION BELT TENSIONER AND IDLER

RELATED APPLICATION

This application claims priority to and all the benefits of U.S. Provisional Patent Application No. 60/330,637, filed on Oct. 26, 2001.

FIELD OF THE INVENTION

The present invention relates to belt tensioners and more particularly to belt tensioners of the type used in automotive engine serpentine belt systems and timing belt systems.

BACKGROUND OF THE INVENTION

Belt tensioners are well known in the prior art and have been used in many belt systems heretofore. A belt tensioner is a movable support structure that rotatably supports a portion of a belt in an engine or other mechanical system. A belt tensioner is movable to compensate for increases or decreases in belt path length due to belt wear, engine temperature, and other factors to provide a constant belt tensioning force on a timing or drive belt.

In a serpentine belt system, the belt to be tensioned by the belt tensioner is typically trained about a driving crankshaft pulley forming part of the belt system and a sequence of driven pulleys. The driven pulleys are connected to shafts which operate various engine components and/or vehicle accessories.

In order to route the belt around the sequence of driven pulleys and provide sufficient belt wrap around the associated pulleys, the use of idler pulleys are often desirable. However, there is always a need in the automotive art to conserve the space at the front portion of the engine, and to reduce the number of components and weight of the vehicle.

It has been proposed in the expired art to provide the benefits of an idler pulley while conserving engine space and reducing parts by providing the idler pulley as part of a belt tensioning assembly. Specifically, see U.S. Pat. No. 1,675,671. However, this patent discloses an arrangement in which an arm 12, having a pulley 14 mounted thereon, is rotatable about a fixed post 5 and an idler pulley 16 is mounted on a rotatable sleeve 9. The arrangement lacks a fixed pivot structure.

The '671 patent is not only lacking a fixed pivot structure as described above, but also discloses the use of a flat coil spring, as opposed to a more desirable helical coil spring. While the helical type coil spring is preferred for belt tensioners, they apply an axial force that must be contained. The manner in which to contain the axial spring force and simultaneously mount an idler pulley in an efficient manner is another aspect that is dealt with in accordance with the present invention.

SUMMARY OF THE INVENTION

It is thus an object of the present invention to overcome the deficiencies noted above in the prior art. In accordance with the principles of the present invention, this objective is achieved by providing a combination belt tensioner and idler having a fixed pivot structure. A moveable arm is mounted for pivotable movement about the pivot structure. A belt tensioning pulley is mounted on the moveable arm. A helical coil spring biases the moveable arm in a direction so as to force the pulley into tensioning engagement with a belt. A mounting bolt mounts the fixed pivot structure on a motor vehicle engine. An idler pulley is mounted for rotational movement about an axis defined by the mounting bolt and in general alignment with the belt.

The present invention further provides a combination belt tensioner and idler pulley including: a fixed pivot structure; an arm mounted for pivotable movement about the pivot structure; a pulley mounted for rotation on the arm; a helical coil torsion spring that biases the arm in a direction so as to force the pulley into tensioning engagement with a belt when the tensioner is installed on an engine, the coil torsion spring being axially compressed and applying an axial force on the arm; a retaining member fixed to the pivot structure and retaining the axial force provided by the coil torsion spring; a mounting bolt mounting the fixed pivot structure on a motor vehicle engine; and an idler pulley engaging with the retaining member and mounted for rotational movement about an axis defined by the mounting bolt.

These and other objects, features, and advantages of this invention will become apparent from the following detailed description when taken into conjunction with the accompanying drawings, which are a part of this disclosure and which illustrate, by way of example, the principles of this invention.

BRIEF DESCRIPTION OF THE DRAWINGS

The accompanying drawings facilitate an understanding of the various embodiments of this invention. In such drawings.

DETAILED DESCRIPTION OF THE PREFERRED EMBODIMENTS

Figure 1:
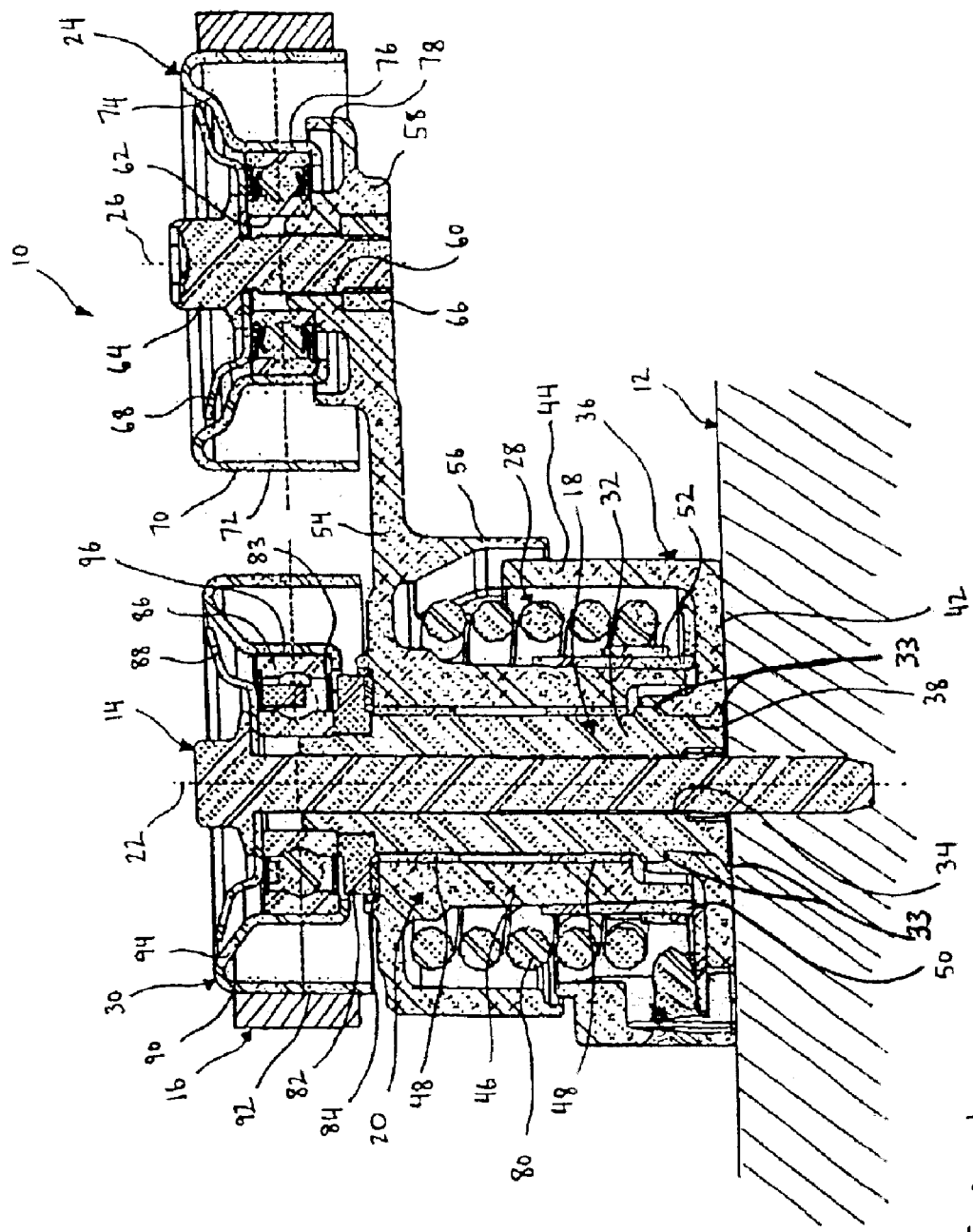
FIG. 1 is a cross-sectional view illustrating the combination belt tensioner and idler constructed in accordance with one embodiment of the present invention.

FIG. 1 illustrates the combination belt tensioner and idler 10, which embodies the principles of the present invention. Preferably, the combination 10 forms a part of a belt drive system for a motor vehicle.

In the illustrated embodiment, the combination 10 is mounted on an engine block or frame 12 of the motor vehicle engine by a threaded steel mounting bolt 14 and is in engagement with a timing or preferably a drive belt 16 of an accessory belt drive system. The combination 10 provides both a belt tensioning device and an idler pulley in a single unit for the belt drive system, as will be further discussed.

The combination 10 includes tensioner comprising a fixed pivot structure 18 and a moveable arm 20 mounted for pivotal movement about the pivot structure 18. A pivot axis 22 is central to the pivot structure 18. A belt tensioning pulley 24 is rotatably mounted on the arm 20 for rotational movement about a rotational axis 26 parallel with the pivotal axis 22. Pulley 24 is radially spaced from the pivot axis 22. Arm 20 is biased in a direction so as to force the pulley 24 into tensioning engagement with the belt 16. In one form of the invention, spring 28, preferably in the form of a steel helical torsion coil spring, is mounted between the fixed pivot structure 18 and the arm 20 to bias the arm 20. An idler pulley 30 is mounted for rotational movement about the pivotal axis 22 at a position further from the engine block 12 and general alignment with the tensioning pulley 24.

Spring biasing of the tensioner is well known in the art. Examples of such tensioners include commonly owned U.S. Pat. Nos. 4,886,484; 4,816,012; 4,583,962; Re 34,543; Re 34,616; U.S. Pat. Nos. 4,698,049; 4,473,362; 4,689,037 5,919,107; 6,149,542; and 6,196,940.

Other forms of biasing tensioners is also known in the art. Examples of hydraulic tensioning include commonly owned U.S. Pat. No. 6,165,091. Other examples include U.S. Pat. Nos. 4,950,209; and 5,833,563.

The pivot structure 18 includes a hollow, generally cylindrical, shaft 32 having a bore 34 extending axially therethrough. The bore 34 receives the mounting bolt 14 that serves to fixedly mount the pivot structure 18 to the engine block 12.

A base or spindle structure 36, preferably formed from aluminum, is positioned adjacent the engine block 12 and has a circular opening 38 for receiving the end of the hollow shaft 32. In the illustrated embodiment, the spindle 36 is secured to the shaft 32 between a pair of spaced projections 33 on the shaft 32. The spindle structure 36 includes a radially outwardly extending annular portion 42 that is to be mounted against the engine block 12. The annular portion 42 leads to a cylindrical wall flange portion 44 that extends axially in a direction away from the engine block 12.

In the illustrated embodiment, the end surfaces of the hollow shaft 32 and the spindle structure 36 are disposed in surface-to-surface engagement with a mounting surface provided on the engine block 12. This mounting surface can be provided by the engine block 12 itself, or by a bracket or the like fixed to the engine block 12.

The arm 20, preferably formed of aluminum, includes a hub portion 46, which is journaled on the hollow shaft 32 by a pair of spaced apart self-lubricating pivot bushings 48. A flanged spring support 50 constituting a damping sleeve, preferably made from nylon, is mounted on the exterior periphery of the arm hub portion 46 with its flange in engagement with the inner surface of the spindle structure 36. A radially inward force-transmitting ring 52, preferably formed from aluminum, is mounted in surrounding relation to the damping sleeve 50 adjacent its flange and in radial abutment with an adjacent volute of the spring 28. As the spring 28 contracts during the operational movements of the arm 20, a radially inward force is transmitted from the spring 28 to damping sleeve 50 through the ring 52. The damping sleeve 50 applies a radially inwardly directed force against the hub portion 46 of the arm 20, so as to apply a frictional force to the hub portion 46 so as to dampen movement of the arm 20. The ring 52 functions to increase the damping of the damping sleeve 50.

The arm 20 also includes an arm portion 54 that is integral with one end of the hub portion 46 and extends radially outwardly therefrom. The circular-shaped inner section of the arm portion 54 is formed with an axially inwardly projecting cylindrical wall portion 56 having a free end which cooperates with the free end of the cylindrical wall portion 44 of the spindle structure 36 to substantially enclose the spring 28.

The arm 20 includes an integral pulley mounting portion 58, which extends axially outwardly from the outer end of the arm portion 54. The mounting portion 58 has a bore 60 extending axially therethrough. The inner race of a ball bearing assembly 62 is fixed on the mounting portion 58 by a steel headed bolt 64 that extends into the bore 60 and is secured by a nut 66. The head of the bolt 64 may serve as a tool-receiving element that aids in installation of the combination belt tensioner and idler 10. A dust shield 68 is disposed between the head of the bolt 64 and the ball bearing assembly 62 to prevent the ingress of dust and debris into the ball bearing assembly 62.

The pulley 24, preferably made of steel, provides an outer annular wall 70 having a smooth belt engaging peripheral surface 72. It will be understood that the outer annular wall 70 could be configured to present a poly V-groove surface or the like.

In the illustrated embodiment, the pulley 24 includes a circular wall 74 extending radially and axially inwardly from one end of the outer annular wall 70 which terminates in an integral hub portion 76 engaged with the outer race of the ball bearing assembly 62. The arm 20 also includes an integral cup shaped portion 78 that generally surrounds the inner end of the ball bearing 62.

The spring 28 is connected between the pivot structure 18 and the arm 20. More particularly, the spring 20 has a main portion 80 coiled freely about the hub portion 46 of the arm 20. The end of the spring 28 closest to the engine block 12 may be engaged with the spindle structure 36 or any other fixed structure, such as the engine block 12. In the illustrated embodiment, the bent end or tang of the spring 28 closest to the engine block 12 extends through the wall portion 44 of the spindle structure 36. The other end of the spring 28 forms a connection with the arm 20. The connection between the other end of the spring 20 and the arm 20 is conventional and operates to bias the arm 20 in a belt-tightening direction about the pivot structure 18. The spring 28 is also axially compressed between the arm 20 and the spindle structure 36, e.g., so as to apply an axial force on the arm 20.

A retaining member 82, preferably made of steel or powder metal, is fixed by a friction fit to the end of the pivot structure 18 furthest from the engine block 12. In the illustrated embodiment, the retaining member 82 is cylindrical in shape and has an opening for receiving the end of the hollow metal shaft 32. The retaining member 82 is engaged with a shoulder provided on the end of the hollow metal shaft 32 and is secured thereon with a friction fit. The retaining member 82 retains the axial force provided by the spring 28 so as to axially retain the arm 20. The retaining member 82 also provides a mounting surface 83 for the idler pulley 30, as will be discussed.

A thrust washer 84, preferably made from nylon 46, is positioned between the arm 20 and the retaining member 82. The thrust washer 84 prevents the metal to metal contact between the arm 20 and the retaining member 82 to reduce wear.

The inner race of a ball bearing assembly 86 is fixed on the upper, narrowed end portion of the hollow metal shaft 32. The head of the mounting bolt 14 applies an axial force that sandwiches and fixes the inner race between the bolt head and the retaining member 82, as shown. In a preferred embodiment, a dust shield 88 is disposed between the head of the bolt 14 and the inner race of the ball bearing assembly 86, as shown, to prevent the ingress of dust and debris into the ball bearing assembly 86.

The idler pulley 30, preferably made of steel, provides an outer annular wall 90 having a smooth belt engaging peripheral surface 92. It will be understood that the outer annular wall 90 could be configured to present a poly V-groove surface or the like.

In the illustrated embodiment, the idler pulley 30 includes a circular wall 94 extending radially and axially inwardly from one end of the outer annular wall 90 which terminates in an integral hub portion 96 engaged with the outer race of the ball bearing assembly 86.

The combination 10 of the illustrated embodiment provides a belt tensioning pulley 24 ganged with an idler pulley 30. The pulleys 24 and 30 are spaced from the engine block 12 at a position adjacent the head of the mounting bolt 14. The pivotal axis 22 of the arm 20 is coaxial with the rotational axis of the idler pulley 30. Thus, the idler pulley 30 is mounted for rotational movement about an axis defined by the mounting bolt 14.

Operation of the combination belt tensioner and idler 10 will now be described. Initially, the mounting bolt 14 is threadably engaged within a threaded opening in the engine block 12 to rigidly fix the pivot structure 18 to the engine block 12. The belt 16 is trained about the drive pulley of the belt drive system and sequence of driven or idler pulleys, including the idler pulley 30. The arm 20 including the pulley 24 may be moved in a direction away from the belt 16 in order to facilitate installation of the belt 16. After the belt is properly positioned, the bias of the spring 82 moves the arm and hence the pulley 24 into tensioning engagement with the belt 16.

When the belt 16 is slackened during operation of the engine, the spring 28 rotates the arm 20 so that the arm 20 causes the pulley 24 to be moved further towards the belt engaging direction to take-up the slack in the belt 16. In contrast, when the belt 16 is tensioned during operation of the engine, the belt 16 applies a load force that causes the arm 20 to be rotated in an opposite direction so that the pulley 24 is moved away from the belt engaging direction by the belt 16 against the force of the spring 28.

It is contemplated that the combination 10 may include arm travel stops to permit a predetermined length of rotational movement of the arm 20 relative to the pivot structure 18.

The idler pulley 30 engages the belt to thereby increase the wrap of the belt 16 around one or more adjacent pulleys of the belt drive system. Increasing the wrap of the belt 16 around a pulley prevents slippage of the belt 16 relative to the pulley by increasing the area of contact between the belt 16 and the pulley. Moreover, the idler pulley 30 enables greater flexibility in installation of accessories on the engine block 12. Specifically, the idler pulley 30 provides an additional belt route so that the accessories are not limited to certain positions on the engine block 12 in order to accommodate the belt 16.

In one embodiment, the idler pulley 30 of the combination 10 may increase the wrap of an alternator and an AC compressor of the belt drive system. Providing a belt tensioning pulley 24 and an idler pulley 30 in a single unit results in cost savings and space savings at the front portion of the engine block 12. Moreover, the combination 10 facilitates installation because the combination 10 provides two components on a single unit.

It is contemplated that a second idler pulley is mounted above the idler pulley 30 to provide routing or increased belt wrap for a second belt.

It is now apparent to those skilled in the art that the present invention relates to a combination tensioner and idler pulley. The present invention has been described in terms of a spring biased tensioner. However, it is now readily understood that hydraulic biased tensioners are equivalent in function to spring biased tensioners.

It can thus be appreciated that the objectives of the present invention have been fully and effectively accomplished. The foregoing specific embodiments have been provided to illustrate the structural and functional principles of the present invention and is not intended to be limiting. To the contrary, the present invention is intended to encompass all modifications, alterations, and substitutions within the spirit and scope of the appended claims.

What is claimed is:

1. A combination belt tensioner and idler comprising:
    a fixed pivot structure;
    a mounting bolt engaging said fixed pivot structure for mounting said fixed pivot structure on a motor vehicle engine;
    an idler pulley mounted on said fixed pivot structure for rotational movement about an axis defined by said mounting bolt;
    a moveable arm mounted on said fixed pivot structure for pivotable movement about said axis;
    a belt tensioning pulley mounted on said moveable arm and spaced from said idler pulley;
    said moveable arm being biased in a direction so as to force said pulley into tensioning engagement with a belt trained about said idler pulley and said belt tensioning pulley; and
    a retaining member secured to said fixed pivot structure and positioned between said idler pulley and said moveable arm, the retaining member axially retaining said moveable arm and providing a mounting surface of said idler pulley.

2. The combination according to claim 1, wherein a spring extends between said moveable arm and said fixed pivot structure providing said biasing.

3. The combination according to claim 2, wherein said spring is a helical coil torsion spring.

4. The combination according to claim 3, wherein said coil torsion spring is disposed in surrounding relation to said fixed pivot structure.

5. The combination according to claim 4, further comprising a damping sleeve mounted in force transmitting relation between said spring and said fixed pivot structure.

6. The combination according to claim 1, wherein said moveable arm includes an arm portion and wherein one end of said arm portion includes a hub portion rotatably journaled on said fixed pivot structure by a pivot bushing, said hub portion pivotally mounted on said fixed pivot structure and said arm portion extending generally radially outwardly therefrom.

7. The combination according to claim 1, wherein said belt tensioning pulley and said idler pulley are spaced from the motor vehicle engine at a position adjacent the head of the mounting bolt.

8. A combination belt tensioner and idler pulley comprising:
- a fixed pivot structure;
- an arm mounted for pivotable movement about an axis defined by said fixed pivot structure;
- a pulley rotatably mounted on said arm at a position distal from said axis;
- a helical coil torsion spring that biases said arm in a direction so as to force said pulley into tensioning engagement with a belt when the tensioner is installed on an engine, said coil torsion spring being axially compressed and applying an axial force on said arm;
- a retaining member fixed to said fixed pivot structure and retaining said axial force provided by said coil torsion spring;
- a mounting bolt for mounting said fixed pivot structure about said axis on a motor vehicle engine; and
- an idler pulley engaging said retaining member and mounted for rotational movement about said axis.

9. The combination according to claim 8, wherein said coil torsion spring is disposed in surrounding relation to said fixed pivot structure.

10. The combination according to claim 8, wherein said arm includes an arm portion and wherein one end of said arm portion includes a hub portion rotatably journaled on said fixed pivot structure by a pivot bushing, said hub portion pivotally mounted on said fixed pivot structure and said arm portion extending generally radially outwardly therefrom.

11. The combination according to claim 10, wherein said hub portion includes a damping sleeve mounted thereon in force transmitting relation to a volute of said coil torsion spring.

12. The combination according to claim 8, wherein said pulley and said idler pulley are spaced from the motor vehicle engine at a position adjacent the head of the mounting bolt.

* * * * *